J. B. MOCKRIDGE.
FEEDING APPARATUS FOR WEIGHING MACHINES AND THE LIKE.
APPLICATION FILED APR. 17, 1916.

1,397,932.

Patented Nov. 22, 1921.

INVENTOR
JOSEPH B. MOCKRIDGE
BY
Mitchell, Chadwick & Kent
ATTYS.

UNITED STATES PATENT OFFICE.

JOSEPH B. MOCKRIDGE, OF NEWARK, NEW JERSEY, ASSIGNOR TO AUTOMATIC WEIGHING MACHINE COMPANY, OF NEWARK, NEW JERSEY, A CORPORATION OF NEW YORK.

FEEDING APPARATUS FOR WEIGHING-MACHINES AND THE LIKE.

1,397,932. Specification of Letters Patent. Patented Nov. 22, 1921.

Application filed April 17, 1916. Serial No. 91,831.

*To all whom it may concern:*

Be it known that I, JOSEPH B. MOCKRIDGE, a citizen of the United States, residing at Newark, in the county of Essex and State of New Jersey, have invented new and useful Improvements in Feeding Apparatus for Weighing-Machines and the like, of which the following is a specification.

This invention relates to improvements in feeding apparatus for weighing machines and the like. More particularly it relates to improvements in the construction of the hopper through which material is fed, under automatic control or otherwise. In fertilizing plants and other industries developing a more or less sticky material it has been found by experience that the material has no constant angle of repose when in a hopper in the form of an inverted cone or pyramid, with an opening in its bottom for discharging material as wanted, but that at times it flows regularly and at other times irregularly with an avalanche effect. When the latter occurs it discharges material in such suddenly enlarged quantity as sometimes interferes with the accuracy and uniformity of the packing weights. Such sticky material has a tendency to adhere to the sides of the hopper, particularly near the orifice, and to flow through only the center of the discharge opening. At times the quantity thus adhering together and sticking to one side of the hopper becomes so great that the adhesion to the hopper is overcome and the whole mass caves in and flushes through the discharge orifice. It is the purpose of the invention to provide an even and uniform flow of material from the orifice, thus eliminating both the disturbance in weighing, produced by irregularity of momentum with which the material strikes the scales, and also by making this stream uniform to enable the operator of the mechanism to shut off the stream of material when the precisely proper weight has been attained in the package.

These objects and the other advantages that are characteristic of the invention are accomplished by providing a hollow cylinder which is supported within the hopper vertically over the discharge orifice thereof at such a distance therefrom as to permit the material to flow between it and the sides, and to flow from the central part of the hopper, and to prevent sudden discharges from the sides passing through the orifice *en masse,* if they occur, and also to prevent their occurrence. The cylinder remains stationary, when once properly adjusted, and does not act as valve but more as a regulator. The invention also comprises means to put the cylinder into the proper adjustment, which may vary according to the pitch, the size and the shape of the hopper with which it is associated. This is accomplished by providing means extending vertically above the cylinder for supporting the same, and then by providing means reaching in from the side of the bin to engage said support and to change its elevation. Although a particular embodiment has been chosen here for illustration, the invention can be applied in other ways without departing from the scope of the appended claims. It is intended that the patent shall cover by suitable expression in the claims whatever features of patentable novelty exist in the invention disclosed.

In the accompanying drawings.

Figure 1:
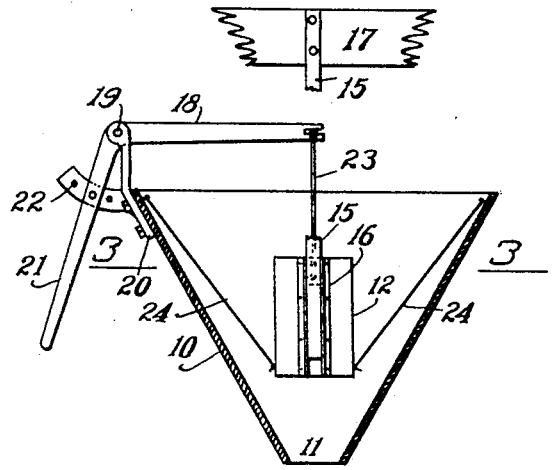
Figure 1, is a side elevation of an embodiment of the invention in medial section but with the central part uncut.
Figure 2:
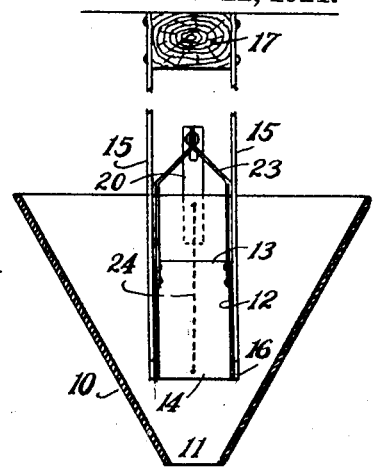
Fig. 2 is a side elevation of the same turned 90°, in medial section, with the central cylinder cut.
Figure 3:
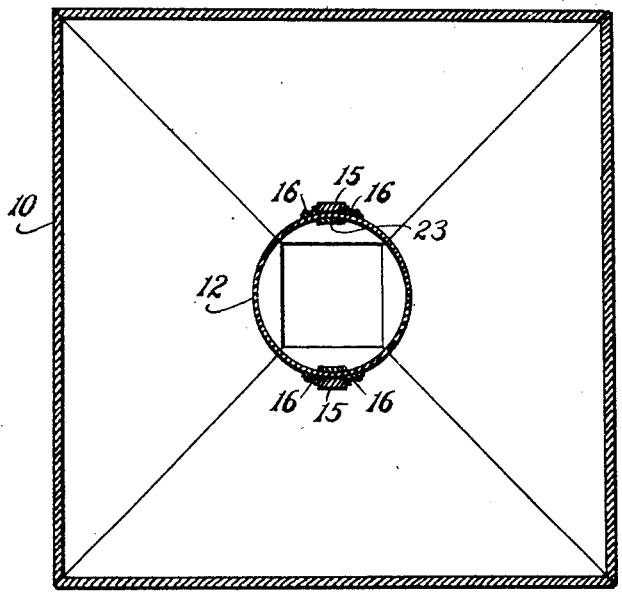
Fig. 3 is a plan, on a larger scale, in section on the line 3—3 of Fig. 1.

Referring to the drawings the hopper indicated by the reference numeral 10 has a discharge orifice 11, the hopper being in the shape of an inverted square pyramid. The invention is applicable, however, to hoppers of conical or of other shape. The means supporting this hopper is not illustrated, as it forms no part of the invention, it being understood that the hopper may be supported in any suitable way. It is proper to mention, however, that an important use of the invention is in connection with a weighing machine adapted to hold a bag or other package which is being filled from the hopper with fertilizer or other material in powdered form. The invention is particularly valuable when the weighing machine is of the automatic type. Such machine, it will be understood is installed below the discharge orifice 11. Above the hopper may be a bin holding a supply of the material, or a chute or other suitable means for supplying material in abundance to the hopper 10. The particular apparatus with which the invention is concerned is a shell 12 suspended within the hopper and near its discharge opening 11. This shell is open at top and bottom, as at 13 and 14, so that the material can pass freely downward through it; and it is preferably made of metal, and of cylindrical shape, whether the hopper be square, oblong, cylindrical or otherwise in form. As illustrated it is made somewhat larger in cross-section than the discharge orifice 11, as that construction has been found to work well. However, it is certain that variation may be made in the relative size of the shell, while still enjoying the benefits that are characteristic of the invention. In order to get the best effect in its operation, the shell should be positioned suitably in height above the orifice, or in relation to the angle, position, or shape of the sides of the hopper. The position at which it should be placed is affected somewhat by the nature and characteristic behavior of the material which is passing through. In the first instance this position may be determined experimentally for any particular hopper, and thereafter on similar installations the shell may be fixed in position. Where different material is to flow at different times, and where a first installation is to be made of any type, the provision for adjusting its elevation now to be described may be utilized. The purpose is to support the shell in the midst of the interior of the hopper without interfering with the flow of material through it and past it on all sides. The drawings illustrate a couple of straps 15 depending vertically from an overhead beam 17 and adapted to engage the shell as guides on diametrically opposite sides. The shell itself is represented as provided with flanged straps 15, coöperating with these straps 15 by engaging each of said straps on each side, so that the shell 12 is held with its axis coinciding with the axis of the hopper, and can move up and down guided by said vertical depending straps 15. Means for moving it up and down is illustrated in the form of a lever 18 adapted to swing up and down over the hopper. This lever is fulcrumed at 19 on a base 20, supported conveniently on the adjacent top edge of the hopper, and can be turned about its fulcrum by the operator handling its free end 21. Means for fastening it in any of various positions to which it is adjusted is illustrated diagrammatically by representation of a pin through one of the holes 22 in a sector attached to and extending from the hopper. The end of the lever over the hopper is attached to a bifurcate strap 23 which engages the two sides of the shell 12 as seen in Fig. 2. Guided by the straps 15, and elevated or depressed by the lever 18, the shell therefore occupies always a position in which its axis coincides with the axis of the hopper 10 and orifice 11, although it may be at differing heights above said orifice. The height at which it works best having been determined by experience for any particular shape of hopper and kind of material, the shell may be left permanently in that adjustment. It is contemplated, in fact, that in many cases it will be fastened permanently in such position by supports from the walls of the hopper. Such supports are illustrated in Figs. 1 and 2 as wires 24, extending from the lower edges of the shell to the upper edges of the hopper. These resist the forces that from time to time press laterally on the shell tending to force it out of position, without interrupting the freedom of passage for material. Moreover, although the material is not expected to choke within the hopper, between it and the shell, yet if it should be found that that occurs in any case where the material is extraordinarily moist, the wires permit the entire shell to be lifted by a single convenient motion of the operator's hand, (in case the lever 21, 18, is present) so that any such jam is instantly broken, from the outside and the shell returned to its normal position.

In operation the shell produces a relatively even and uniform flow of material from the discharge orifice of the hopper, without varying the extent of opening of the orifice such as might be supposed to be necessary in order to produce a uniform flow under varying conditions of pressure and flushing of material toward the orifice. In the preferred form material passes through the shell as well as around it. The proximity of the lower edge 14 of the shell to the sides of hopper, at a level a short distance above the orifice, prevents material, that may have adhered to and piled up on one side or another of the hopper, from breaking loose suddenly and rushing through the orifice in unusual quantity. While the device is useful for pulverized materials that flow freely it is particularly so for materials which are more or less sticky, which by their nature tend to adhere to the sides of the hopper and to adhere to themselves until a quantity is accumulated sufficient to break away as mentioned. Owing to the uniformity of the discharge thus produced, the workman who is watching the scales as a bag is being filled does not have his work disturbed and the scales unduly depressed by extraordinary or uncalculated variations of momentum of the descending material; and the uniformity produced enables him to operate whatever means is provided to shut off the falling stream at the desired point without the danger that an unexpected avalanche may flush through just at the end as the bag is nearly full and before he can shut it off. The same advantages are attained where the shutting off is automatic. The result is more accurate weights and more precise operation in other respects; and in some degree a larger output, because the workman or the machine can allow the flow to run longer at the full rate when the danger of irregularity is eliminated.

I claim as my invention:

1. A feed regulating device comprising in combination a hopper, having an unobstructed discharge orifice to which the hopper sides converge downward, and a large vertical sided tube arranged within the hopper, in normal operation standing at a fixed elevation above said orifice, said tube being open at top and bottom in cross sectional area substantially equalling the horizontal-plane projection of the tube whereby the flow of hopper contents to the orifice is made regular.

2. In combination, a hopper having sides converging to its discharge orifice; a shell arranged within the hopper and over the orifice, having sides extending upward and divergingly with respect to the hopper walls from bottom edges adjacent to the said sides of the hopper constituting barriers for the flow of material outside of the shell and adapted to regulate the flow of material to said orifice; means to adjust the elevation of said shell along the axis of the hopper, independently of the adjustment of the size of said discharge orifice, and means to fix the said adjusting means in various positions.

3. In combination, a hopper having sides converging to its discharge orifice; a shell arranged within the hopper and over the orifice, having sides extending upward from bottom edges adjacent to the said sides of the hopper and adapted to regulate the flow of material to said orifice; and flexible ties extending obliquely upward and outward in different directions from the shell, maintaining it removably in said position.

Signed by me at Macon, Ga., this eleventh day of April, 1916.

JOSEPH B. MOCKRIDGE.

Witnesses:
S. M. GAMBLE,
C. F. WATKINS.